United States Patent
Ackley

(10) Patent No.: US 6,478,223 B1
(45) Date of Patent: Nov. 12, 2002

(54) MACHINE-READABLE COLOR SYMBOLOGY AND METHOD AND APPARATUS FOR READING SAME WITH STANDARD READERS SUCH AS LASER SCANNERS

(75) Inventor: H. Sprague Ackley, Seattle, WA (US)

(73) Assignee: Intermec IP Corporation, Woodland Hills, CA (US)

( * ) Notice: Subject to any disclaimer, the term of this patent is extended or adjusted under 35 U.S.C. 154(b) by 0 days.

(21) Appl. No.: 09/481,837

(22) Filed: Jan. 12, 2000

(51) Int. Cl.⁷ .............................. G06K 7/10; G06K 7/12; G06K 7/14; G06K 19/08
(52) U.S. Cl. ........................... 235/462.04; 235/462.02; 235/462.01; 235/462.16
(58) Field of Search ........................ 235/462.04, 462.02, 235/462.16, 462.01

(56) References Cited

U.S. PATENT DOCUMENTS

| | | | |
|---|---|---|---|
| 3,684,868 A | * 8/1972 | Christie et al. | ....... 235/61.11 E |
| 4,998,010 A | 3/1991 | Chandler et al. | |
| 5,171,976 A | * 12/1992 | Bone, Jr. | .................... 235/375 |
| 5,389,770 A | 2/1995 | Ackley | |
| 5,486,689 A | 1/1996 | Ackley | |
| 5,514,858 A | 5/1996 | Ackley | |
| 5,539,191 A | 7/1996 | Ackley | |
| 5,798,513 A | * 8/1998 | Ackley | ....................... 235/462 |
| 5,877,486 A | 3/1999 | Maltsev et al. | |

OTHER PUBLICATIONS

Palmer, *The Bar Code Book*, Third Edition, Helmers Publishing, Inc., Peterborough, New Hampshire, 1995 (ISBN 0–911261–09–5), pp. 1–74.

* cited by examiner

Primary Examiner—Karl D. Frech
Assistant Examiner—Lisa M. Caputo
(74) Attorney, Agent, or Firm—Seed IP Law Group PLLC

(57) ABSTRACT

A color symbology, such as a bar code symbology, employs three or more colors to encode elements of one or more integer-widths. A light source or an appropriate filter of a color matched to one color of the symbology produces peaks in a reflectance signal produced from a light sensor, which receives light reflected from the symbol. Another, unmatched, color in the symbology produces valleys in the reflectance profile. A third or intermediate color produces a reflectance signal in a middle portion of the reflectance profile. By identifying the peaks and valleys in the profile, the portions corresponding to the intermediate color, may be found by measuring distances between centers of the peaks and valleys in the reflectance profile. As a result, all elements, of all colors in the symbol, may be decoded using a simple data collection reader, such as a laser scanner, employing only a single color laser.

33 Claims, 4 Drawing Sheets

(1 of 4 Drawing Sheet(s) Filed in Color)

MACHINE-READABLE COLOR SYMBOLOGY AND METHOD AND APPARATUS FOR READING SAME WITH STANDARD READERS SUCH AS LASER SCANNERS

TECHNICAL FIELD

This invention is generally related to automatic data collection ("ADC") and more particularly to automatic data collection employing color machine-readable symbols selected from a color symbology.

BACKGROUND OF THE INVENTION

Bar code scanners and wand-based readers ("readers") scan and decode typical bar codes from linear symbologies. "Linear symbologies" are symbologies where data is encoded as parallel arrangements of alternating, multiple-width bars and spaces (e.g., U.P.C., Code 39, Code 93, etc.). Linear symbologies, as well as other symbologies, encode "data characters" (i.e., human-readable characters) as "symbol characters," which are typically alternating bars and spaces. In typical linear symbologies, such as Code 39, each bar and space, or "element," in the symbol is one of four narrow and wide elements: a single-width bar, a single-width space, a double-width bar or a double-width space. More complex linear or stacked symbologies employ a greater number of widths for each element.

Bar code readers typically convert symbol characters to data characters by scanning an area to produce a reflectance signal or bar code "profile," which is generally an analog signal representing the modulated light reflected from areas of high reflectance or "spaces," and absorbed by areas of low reflectance or "bars." As a result, the profile represents the pattern of bars and spaces, or "elements," in the symbol. In a given profile, a peak corresponds to a space (high reflectivity), while a valley corresponds to a bar (low reflectivity, relative to the space). The width of each peak or valley generally indicates the width of the corresponding bar or space whose reflectance produced the peak or valley.

Many bar code readers employ "wave shaping" circuits that essentially square off the profile based on transitions or vertical edges between the peaks and valleys in the profile. Counting circuits then produce a series of counts that indicate the horizontal widths of the bars and spaces from the linear bar code symbol. A typical locating algorithm in the reader locates a bar code symbol by examining the series of counts to attempt to find a quiet zone and an adjacent start/stop symbol character. A "quiet zone" is a clear space, containing no dark marks, that precedes or follows a symbol, often next to a start or stop character. "Start and stop characters" are symbol characters, unique to a given symbology, that indicate the beginning and end of a given symbol, respectively. Typically, a quiet zone has a size that is about ten times greater than bars that precede or follow the quiet zone. Therefore, the reader examines a series of counts and attempts to find a count that is approximately ten times greater than a count which follows thereafter. Once the quiet zone and adjacent start/stop character have been located, standard decode algorithms are employed to decode series of counts from the symbol into data characters.

Wand-type readers contact the surface on which the bar code is printed. Such readers often produce profiles having sharp contrast between the peaks and valleys and thus the spaces and bars represented by the profile are easily detectable by circuitry in the reader. However, wand-type readers require the wand to contact the surface on which the bar code is printed, and are thus impractical in situations where a user cannot or does not wish to physically contact the bar code. Requiring the user to manually contact each bar code is time consuming and reduces productivity.

Non-contact bar code readers are currently available such as laser scanning and linear charge-coupled device ("CCD") readers. Laser scanning-type readers employ a scanning beam of laser light which impinges on and is reflected from a bar code. A photodetector receives the reflected light and converts it into a modulated electrical signal that comprises the profile for the bar code.

Wand-based readers and laser scanners are often adequate to scan and decode linear symbologies. However, newer data collection symbologies have departed from the typical linear symbologies to create stacked or area symbologies in order to increase "information density," i.e., the amount of information encoded within a given area. "Stacked symbologies," or multi-row symbologies, employ several adjacent rows of multiple-width bars and spaces (e.g., Code 49, PDF417, etc.). "Area symbologies" or two-dimensional matrix symbologies, employ arrangements of regular polygon-shaped data cells where the center-to-center distance of adjacent data cells is uniform (e.g., MaxiCode, Code One, Data Matrix, Aztec Code, etc.).

One symbology, similar to MaxiCode, described in U.S. Pat. No. 4,998,010, uses three colors of hexagonal data cells, white, black and grey. The use of color and/or shading can increase the information density of machine-readable symbols. Such non-black and white or "color" symbologies have yet to realize significant commercial success, at least partially due to technological problems associated with reading color symbols. Attempts to read color symbols have relied on two-dimensional image sensors, typically color sensors. Stacked and area symbologies also typically require image or vision-based readers that produce two-dimensional images of a field of view. Image or vision-based readers employ two-dimensional semiconductor arrays, vidicons, or other suitable light receiving elements that receive an image of a bar code and, based on the light reflected therefrom, process the image to produce a profile or other signals.

For color symbols, such devices read color in sequential steps, limiting such readers to fixed mount reading devices. See, e.g., U.S. Pat. No. 3,684,868. Fixed mount readers are not practical in a large variety of applications that require mobility, and thus place undue limitations on the use and commercial acceptance of color machine-readable symbologies. Other drawbacks of such devices can include the relatively high cost of two-dimensional video charge coupled devices and the relatively small depth-of-field of such devices as compared to laser scanning symbol readers.

SUMMARY OF THE INVENTION

Due to optical system limitations inherent in laser- or image-type readers, these readers have a specified depth-of-field within which bar codes can be read. If a reader scans or images a bar code out of its depth-of-field, the resulting profile will exhibit "closure." Positive ink spread in a bar code or excessive noise in a profile can also produce closure. Closure in a bar code profile is evidenced by some recognizable peaks and valleys, but also ripples in the middle of the profile. Closure in a bar code profile generally indicates that the wide elements in the profile are resolved, but that the narrow elements are unresolved. With respect to readers, a space or bar is "resolved" if the reader is able to identify a peak or valley in the profile that corresponds to the given space or bar. Some profiles may represent narrow elements by small peaks, valleys or ripples that are visually recognizable, but which are essentially undetectable by current readers.

Typical readers are unable to decode profiles having closure. As noted above, these readers typically employ wave shaping circuits to find the edges of bar code elements represented in a profile. To decode each element in the bar code, these electronic circuits locate an edge of an element as a point where, for example, the reflectance in the profile reaches a fixed distance from a peak or valley. Currently available readers cannot decode profiles where the narrow elements are out-of-focus or lost in the profile (i.e., profile closure) because the narrow elements fail to produce any significant peaks or valleys and thus the wave shaping circuitry is unable to locate any edges in the profile corresponding to these elements. Since current wave shaping circuits cannot locate the narrow elements in a profile when closure occurs, the circuits cannot decode the bar code.

Recently, the inventor has discovered method and corresponding apparatus for decoding machine-readable symbols profiles exhibiting closure. U.S. Pat. Nos. 5,389,770, 5,486,689, 5,514,858, 5,539,191, 5,798,513 and 5,877,486 and U.S. patent application Nos. 09/133,387 and 09/185,905, entitled "Method and Apparatus for Decoding Unresolved Profiles Produced from Relief Formed Symbols" and "Method and Apparatus for Decoding Unresolved Symbol Profiles Produced from a Reduced Data Set" respectively, explain such methods and apparatus in detail. Reading color symbols with a single color reader, such as a laser scanner with a red laser, will produce profiles similar to profiles that exhibit closure. Consequently, existing readers that read standard black and white symbols are unable to read and decode color symbols. As noted above, the only existing readers capable of reading color symbols are expensive. Furthermore, such readers are limited to fixed mount applications.

Under an aspect of the invention and for ease in explaining the concepts, a reader, such as a laser scanner, uses existing components in standard readers to decode color symbols. The reader is capable of scanning or reading simple color bar code symbols that have two-color wide elements, for example, red and blue wide elements. Elements of a third color, such as yellow, exhibit closure like behavior in a manner found to be similar to out-of-focus decoding. Such a symbology, for example, may be similar to the known Code 39 symbology, but where wide bars are, e.g., blue, wide spaces are red, and all narrow elements are yellow. When seen with a single color red laser scanner, red bars form peaks, blue bars form valleys, and yellow elements form intermediate reflectance values in the profile. By using the located centers of the red and blue elements in a profile, as well as the amplitude of the signal in the profile, a simple algorithm and processor decodes the profile by identifying the yellow elements in a similar fashion to profiles exhibiting closure.

The patent or application file contains at least one drawing executed in color. Copies of this patent or patent application publication with color drawing(s) will be provided by the Office upon request and payment of the necessary fee.

BRIEF DESCRIPTION OF THE DRAWINGS

The headings provided herein are for convenience only and do not interpret the scope or meaning of the claimed invention. In the drawings, identical reference numbers identify similar elements or acts.

FIG. 7 is a block diagram of a data collection symbology printer for printing color symbols, such as the symbol of FIG. 2.

DETAILED DESCRIPTION OF THE ILLUSTRATED EMBODIMENTS

In the following description, certain specific details are set forth in order to provide a thorough understanding of various embodiments of the invention. However, one skilled in the art will understand that the invention may be practiced without these details. In other instances, well-known structures associated with symbol readers, decoders, optics, image sensors and microprocessors have not been shown or described in detail to avoid unnecessarily obscuring descriptions of the embodiments of the invention.

Sample Color Symbology Reader

Figure 1:
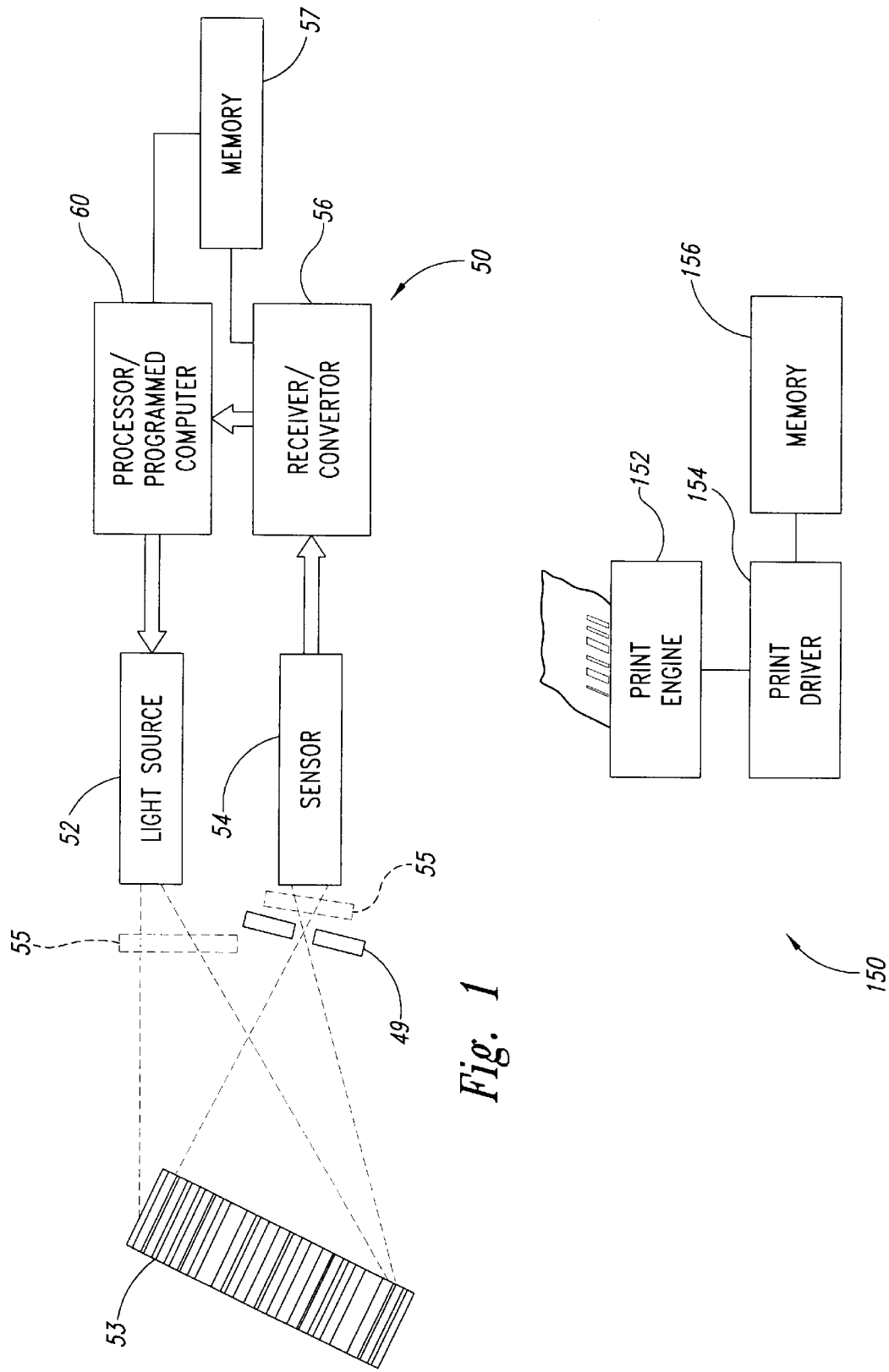
FIG. 1 is a block diagram of a data collection symbology reader with a plan view of a linear bar code symbol.
Figure 2:
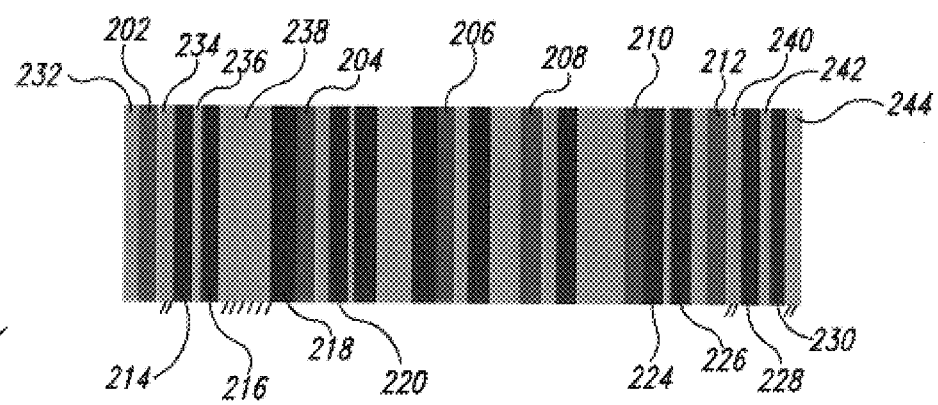
FIG. 2 is an example of a color bar code symbol under one aspect of the invention.

As shown in FIG. 1, a data collection symbology reader 50 of the invention includes a light source 52 that illuminates a data collection or other symbol, such as a color symbol 53 based on Code 39 (shown more clearly in FIG. 2). As used herein, a "data collection symbol" refers to a symbol from any linear, stacked, area or other machine-readable symbology. A sensor 54 having an optical aperture 49, receives light reflected from the symbol 53 and converts the received light into an electrical signal or profile. For example, the light source 52 is a rasterizing laser, while the sensor 54, in turn, is a photodetector. Mechanisms for scanning illumination beams are known in the art including mechanical and electrical mechanisms detailed in The Bar Code Book, Third Edition, by Roger C. Palmer, Helmers Publishing, Inc., Peterborough, N.H., U.S.A. (1995) (ISBN 0-911261-09-5).

In an alternative embodiment, the light source 52 can emit broad spectrum light (such as white light) or light of more than one color, but employ a filter 55 either with the light source 52 or preceding the sensor 54. Thus, the light source 52 can be an LED, flashbulb, or other light-emitting element. The sensor 54 can be a one or two dimensional CCD, semiconductor array such as "CMOS", vidicon, or other area imager capable of converting received light into electrical signals.

A receiver or converter 56 receives the electrical signal from the sensor 54 and converts it into a signal to be processed by a programmed computer or processor 60. Typically, the sensor 54 produces an analog profile signal that represents the modulated light reflected from the elements in the symbol 53. If the processor 60 is a digital computer, then the converter 56 converts the profile from an analog signal produced by the sensor 54 to a multi-level digital profile signal that numerically represents the various amplitudes of the analog signal. The converter 56 and/or processor 60 are coupled to a memory 57 for storing the profile in digital form. The converter 56, memory 57 and processor 60 can be integrated on or in a single chip. The term "processor" as generally used herein refers to any logic processing unit, such as one or more central processing units (CPUs), digital signal processors (DSPs), application-specific integrated circuits (ASIC).

Importantly, the rasterizing laser produces light of a color similar or matched to the color of one of the two wide elements in the symbol 53. As used generally herein, the terms "matched," "matched color" or the like correspond to a color received by the sensor 54 that is similar to a color of a first set of elements in the symbol and produces a high reflectance state. The terms "unmatched," "unmatched color" and the like correspond to a color received by the sensor 54 that is opposite to the matched color with respect to additive or subtractive color techniques and produces a low reflectance state. The terms "intermediate," "intermediate color" or the like correspond to a color between the matched and unmatched colors, which produces a intermediate value in reflectance profiles from symbols encoded with the matched, unmatched and intermediate colors.

Color Symbology

Referring to FIG. 2, the symbol 53 is effectively encoded under the Code 39 standard, but where 2-wide bars (or spaces) are blue, 2-wide spaces (or bars) are red, and all narrow bars (both bars and spaces) are yellow. Thus, the symbol 53 includes six wide red elements 202, 204, 206, 208, 210 and 212, and twelve wide blue elements, the first four of which are 214, 216, 218, and 220, and the last four of which are 224, 226, 228 and 230. The symbol 53 is encoded under the Code 39 standard to demonstrate the concept, but any color symbology could be used, including one which is not based on an existing standard symbology. The symbol 53 begins with one narrow yellow element 232, followed by two adjacent yellow elements 234 (between the red element 202 and the blue element 214). The narrow yellow elements in FIG. 2 are shown as having a more greenish tint; actual printed symbols may have more of a yellowish tint, although such a greenish tint can produce acceptable profiles that may be decoded under methods described herein. While blue, red and yellow are employed, the blue could be green or dark violet, the red could be orange or light yellow, and the yellow or intermediate color could be yellow-green or light brown so long as such intermediate color produces an intermediate value in reflectance profiles from symbols encoded with such colors. The two adjacent yellow elements 234 appear in the symbol 53 as a single wide yellow element (with hash marks denoting the separate elements). Thereafter, a single narrow yellow element 236 separates the blue elements 214 and 216. Six adjacent narrow yellow 238 follow the blue element 216. The symbol 53 ends with two narrow yellow elements 240, the blue element 228, a single narrow element 242, the blue element 230, and finally two narrow yellow elements 244.

In general, light of a particular color reflects more from a similar or matched color surface than from the surface of a complementary or unmatched color (e.g., a color approximately opposed from the particular color on a color chart, such as red, green and blue, which are complementary colors to one another). As an example, if the light source 52 produces a red illumination beam, the red beam will reflect more from the red bars 202, 204, 206, etc., than from the blue bars 214, 216, etc. in the symbol 53. Similarly, light of a particular color will reflect better from a surface of an adjacent color (e.g., a color between primary colors, such as yellow, magenta and cyan), than from a complementary color, although the light will not reflect as well as light from the surface of the same color. Thus, continuing the example, the red illumination beam will reflect more from the yellow bars 232, 234, etc. than from the blue bars 214, 216, etc. in the symbol 53. The different intensifies of reflected light define at least three different optical states, corresponding to "high" (for color similar to the received light such as red in this example), "intermediate" (corresponding to yellow in this example), and "low" (corresponding to blue in this example), all of which are a function of light, the color of the elements in the symbol 53, and the color received by the sensor 54.

Figure 5:
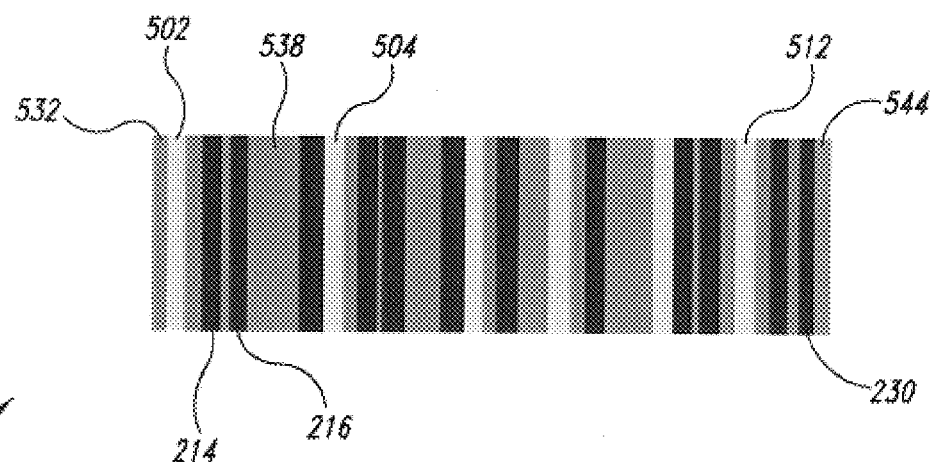
FIG. 5 is an example of an alternative embodiment of a color bar code symbol, which is similar to the symbol of FIG. 2.

Under the example symbology, at least one color of a symbol such as the symbol 53 must be similar or matched to a color of light received by the sensor 54, and another color must be effectively complementary, opposite or unmatched to the matched color with respect to the color chart and a third, intermediate color between these two colors. Thus, while the illustrated embodiment described herein employs red elements that are similar to the red light produced from a red laser in the light source 52, and blue elements that are effectively opposite red on the color chart, other color systems may be employed. For example, FIG. 5 shows a symbol 500 employing yellow, blue and green elements. A yellow laser may be used to produce peaks for yellow elements 502, 504 and 512, and valleys for blue elements 214, 216 and 230 in a manner similar to the symbol 53 in FIG. 2. The green elements, such as elements 532, 538 and 544 produce values in the middle of a profile signal produced from the symbol 500.

Figure 6:
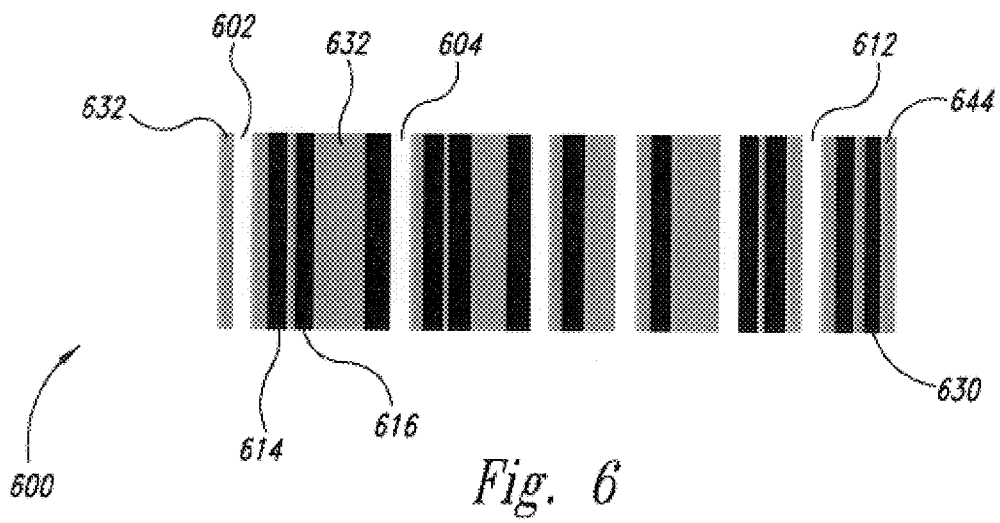
FIG. 6 is an example of another alternative embodiment of a color bar code symbol, which is similar to the symbol of FIG. 2.

FIG. 6 shows another example of a symbol 600 that employs white elements, such as element 602, 604 and 612, and black elements, such as element 614, 616 and 630. The symbol 600 also employs gray elements, such as elements 632, 638 and 644. When scanned or imaged with a white light source, the white elements produce peaks, the black elements produce valleys, and the gray elements produce ripples or signals in the middle of a profile. Thus, the symbol 600, as well as the symbols 500 and 53 can be decoded using standard laser scanning or image capture apparatus using the method described herein. Additionally, ambient white light may be employed with the symbol 600 (or other symbols described herein), thus avoiding the need for the light source 52 in the reader 50.

Further examples of color combinations useful with red light include symbols having: matched elements encoded with both red and orange colors, unmatched elements encoded in both blue and green, with intermediate elements encoded in both yellow and brown. Generally, any color combination may be employed where one set of elements produce high optical states or peaks in the profile, another set of elements produce low optical states or valleys, and another set of elements produce intermediate optical states, in a region between the peaks and valleys. For example, a symbol may be encoded with black elements, white elements and a third element encoded with an intermediate color between black and white such as yellow, green or brown.

In an alternative embodiment, a two-wide symbology, such as Code 39 or Interleaved two of five is modified wherein the one-wide bars and spaces are formed of the matched and unmatched colors, and all of the two-wide bars and spaces are formed of the intermediate color. The decoding techniques described below then simply identifies all one-wide bars and spaces and determines the number of two-wide bars/spaces there between. In yet another alternative embodiment, a known or industry standard symbology, such as UPC, is encoded where all one-wide elements are yellow, two-wide bars are dark blue, three-wide bars are medium blue and four-wide bars are light blue, while two-, three-, and four-wide spaces are dark, medium and light red, respectively. The routine described below distinguishes between two-, three- and four-wide bars and spaces based on amplitudes of peaks and valleys produced therefrom.

Figure 3:
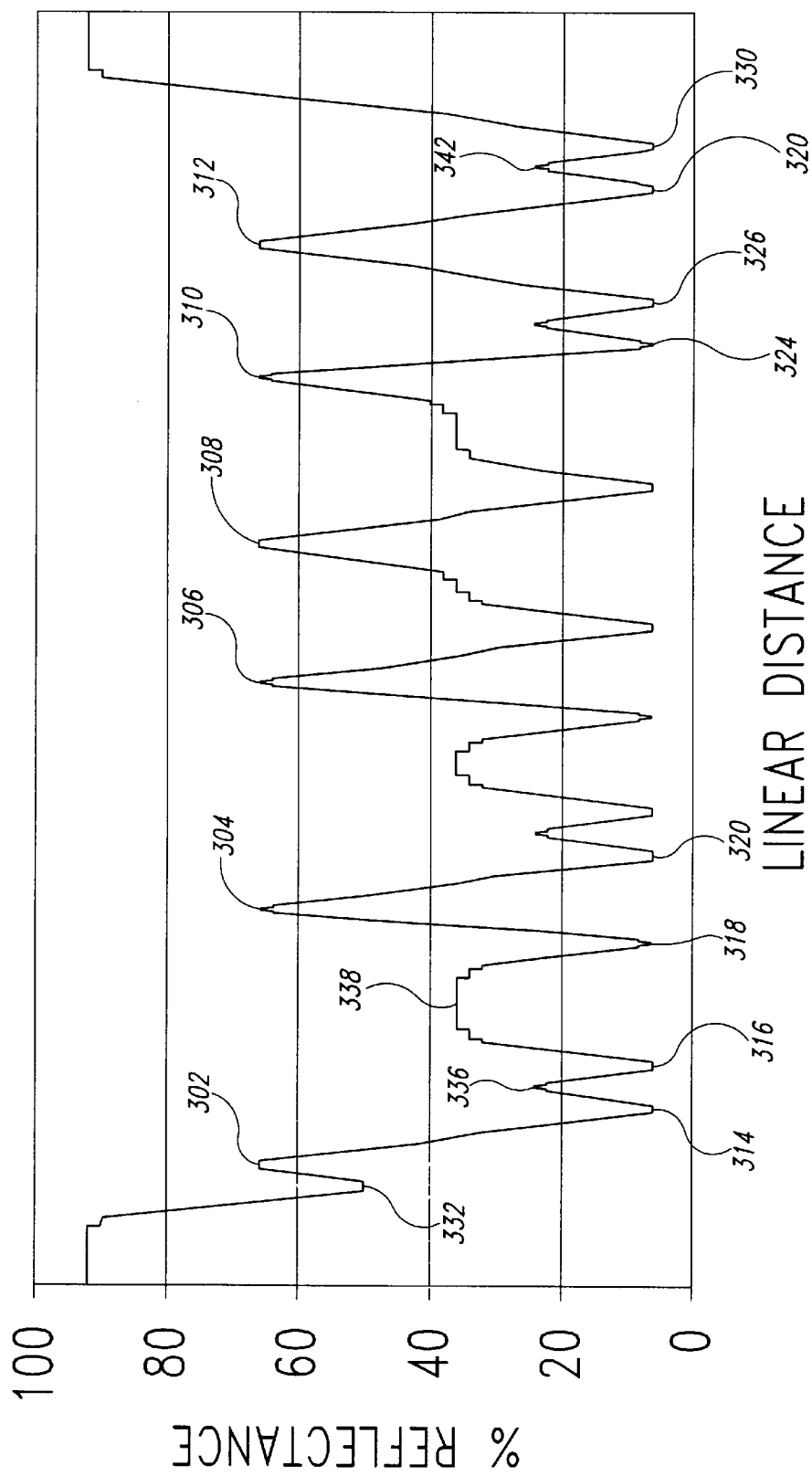
FIG. 3 is an exemplary profile produced by a sampling path or scan through the symbol of FIG. 2.

Referring to FIG. 3, an example of a profile produced by a laser scanner for the reader 50 based on the symbol 53 is shown. The shape of the profile produced by the reader 50 depends on the color of modulated light received from the symbol 53, and also other factors such as the size of the aperture 49 preceding the light detector in the sensor 54, and whether the symbol 53 is in focus, contains printing defects, etc. The profile of FIG. 3 shows a "color" profile, i.e., there are three distinct reflectance states in the symbol 53 identified by a reader. Importantly, as shown in FIG. 3, the red elements 202, 204, 206, 208, 210, and 212 produce the peaks 302, 304, 306, 308, 310 and 312, respectively, each of which has a percent reflectance of approximately 68 percent. Conversely, the blue elements produce valleys in the profile of FIG. 3. For example, the first and last four blue elements 214, 216, 218, 220, 224, 226, 228 and 230, produce valleys 314, 316, 318, 320, 324, 326, 328 and 330, respectively, each of which has approximately an eight percent reflectance. The yellow elements produce peaks or ripples, if at all, in the middle of the profile of FIG. 3, typically in the range of 24 to 50 percent reflectance. The yellow elements 232 and 236 produce the short valley and peak 332 and 336, respectively. The yellow elements 234 fail to produce any peak or valley in the profile. The yellow elements 238 produce the short peak 338 at approximately 40 percent reflectance. Likewise, the yellow element 242 produces the short peak 342.

As noted above, the elements or shapes in the color symbology are matched to the color of the light source or properties of the filter 55 so that the sensor 54 produces peaks for elements of the matched color and valleys for elements of the unmatched color, but the elements of the intermediate range are in the middle of the reflectance range of the profile. Since yellow and dark yellow elements are half-way between red and green on the color wheel, they reflect only half as much intensity as red elements.

Based on centers distances, the processor 60 can employ one or more of the inventor's techniques described in the following patents or applications: U.S. Pat. No. 5,389,770, entitled "Method and Apparatus for Decoding Unresolved Bar Code Profiles," U.S. Pat. No. 5,486,689, entitled "Method and Apparatus for Decoding Unresolved Multi-width Element Bar Code Symbology Profiles," U.S. Pat. No. 5,514,858, entitled "Method and Apparatus for Decoding Unresolved Complex Multi-Width Bar Code Symbology Profiles," U.S. Pat. No. 5,539,191, entitled "Method and Apparatus for Decoding Unresolved Bar Code Profiles Using Edge Finding Circuitry," U.S. Pat. No. 5,798,513, entitled "Method and Apparatus for Decoding Unresolved Profiles Produced From Relief Formed Symbols," U.S. Pat. No. 5,877,486, entitled "Method and Apparatus for Enhancing Resolution of Reflecting Signals Produced from Machine-Readable Symbols," U.S. patent application No. 09/133,387, entitled "Method and Apparatus for Decoding Unresolved Profiles Produced from Relief Formed Symbols," and U.S. patent application No. 09/185,905, entitled "Method and Apparatus for Decoding Unresolved Symbol Profiles Produced from a Reduced Data Set," all of which are assigned to the assignee of this invention.

Any industry standard two width symbology having narrow and wide bars and narrow and wide spaces may be modified to be readable using the color symbology decode method of the invention. Examples of such two width symbologies include Code 39 and Interleaved 2 of 5. Standardized multi-width, or other complex symbologies may similarly be modified under the invention, such as UPC, Code 93 and PDF417. Modifying such symbologies to the example color symbology simply requires all wide bars (bars having two-wide or larger module widths) to be associated with the unmatched color, and the wide spaces to be associated with the matched color. One-wide or narrow elements for the symbology can then be associated with the intermediate color. Employing the techniques described herein, the reader 50 then distinguishes between wide elements as well as identifying all elements of the third color in this color symbology.

Importantly, any symbology having at least three distinct optical states can be decoded using the color symbology method including those not based on industry standard symbologies. For instance, the method would work well with a symbology having elements assigned to colors in a manner which is independent of element size including symbologies not yet developed.

Decoding Method For Color Symbols

Figure 4:
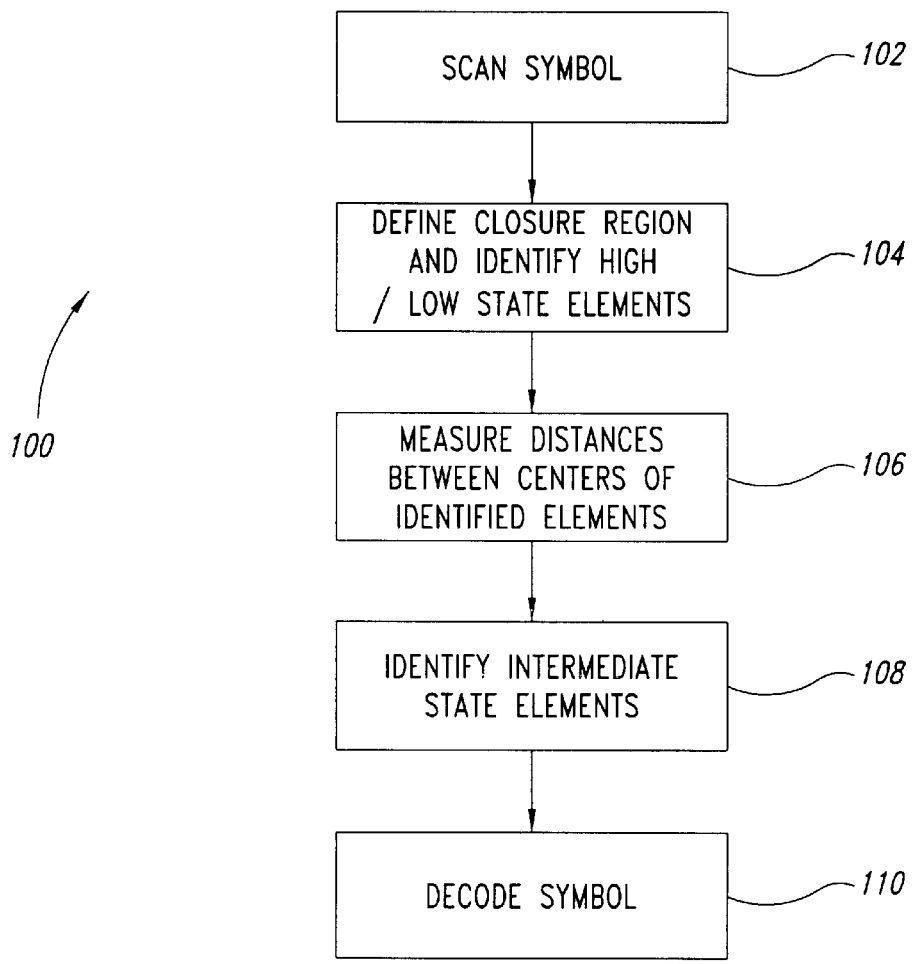
FIG. 4 is a flowchart of a method for reading and decoding the profile of FIG. 3.

Referring to FIG. 4, a routine 100 reads a color bar code symbol, such as the symbol 53, or other color data collection symbols using a typical laser scanner having a red light laser to image the symbol. Of course, other types of readers may be employed, such as CCD-type readers that analyze pixels in a stored image.

The routine 100 begins in step 102 where the reader scans or images, the symbol 53. For example, the reader 50 can be a hand-held product and include a trigger switch (not shown) coupled to the processor 60 that causes the light source 52 to illuminate the symbol 53, and allow the sensor 54, converter 56 and processor 60 to store an image of the symbol in the memory 57 upon actuation of the switch. The specific means and methods for scanning and storing an image of a symbol by the reader 50 are conventional and will be understood by those skilled in the relevant art without need for further description herein.

In order to use the concepts of the previously identified patents, the color symbol need not be out-of-focus since the three optical states are present in the printed symbol. The nomenclature of the above patents must be modified to apply the concepts to the color symbols. A "wide" or "resolved" element is simply a color element with a high or low reflectance, corresponding respectively to high and low optical states. Such elements need not be wide, but could be any size, including narrow. The "number of narrow elements" or "lost elements" or "closure elements" is simply the width of the element of the third optical state, being of intermediate reflectance between the high and low optical states. For instance, for the color symbol of FIG. 2, the elements printed in the leftmost start character are:

Element Width: 1 2 2 2 1 2 2
Color: Y R Y B Y B Y

Note that the color symbol is scanned using an in-focus optical system, yet yields a profile that can be decoded as if the symbol was printed with black and white elements and scanned with an out-of-focus optical system. Indeed, the routine 100 can even decode the symbol 53 if it were unresolved, albeit not too severely unresolved.

In steps 104–108, the processor 60 employs one or more of the techniques described in the inventor's previously identified U.S. patents and applications to effectively (i) identify the higher peaks and lower valleys in the profile, (ii) bound such peaks and valleys as resolved high and/or optical state elements, (iii) identify and classify such high and low optical state elements, (iv) measure distances between centers of identified elements, and (v) identify sizes of intermediate optical state elements between the identified high and low state elements. Beginning in step 104, the processor 60 defines a closure region that identifies high and low state elements. These elements represent larger peaks and valleys in the profile. With simple two-width symbologies, such as Code 39, all of the wide elements have peaks or valleys that have approximately the same reflectance value. With more complex symbologies, one or more closure regions or thresholds must be identified to distinguish two-wide, three-wide, and larger elements from each other. In step 104, the processor 60 may verify or identify the width of each high and low state element for these more complex symbologies.

Alternatively, the processor 60 can identify the high and low state elements as having a lower frequency, or greater amplitude, from the remaining portions in the profile having higher frequency or greater amplitude, which correspond to the intermediate state elements. With the alternative symbology described above employing four-wide elements, the processor 60 distinguishes two-wide, three-wide and four-wide elements based upon three different threshold amplitudes for peaks, and similar thresholds for valleys in the profile. Alternatively element widths may be determined by measuring matched and unmatched elements at the closure boundaries.

In step 106, the processor 60 measures distances between centers of identified high and low state elements. The center of each such element is the center of a peak or valley for all elements identified in previous step 104. In step 106, the processor 60 analyzes the profile and the measured distances, such as start and stop characters, to determine a representative narrow element width, unit distance or X-dimension for the profile. Based on the unit distance, the processor 60 in step 108 constructs a matrix for determining widths of intermediate state elements between the centers of high and/or low state elements. Based on the measured distances the intermediate state elements are identified, and the profile is subsequently decoded in step 110.

For the illustrated symbol 53 in FIG. 2, one-wide elements of the intermediate color must be identified. The processor 60, therefore, employs a lost element matrix as described in the above U.S. Patents and Applications to identify a number of one-wide elements of the intermediate color that are positioned between wide elements of the matched and/or unmatched colors. The processor 60 simply determines a distance between elements of the matched and unmatched colors, determines a unit distance for the one-wide elements in the symbol 53, and then determines a number of such one-wide elements within such measured distances.

While the edges of elements may shift or become difficult to locate (especially using current edge finding circuitry), the centers of the elements remain substantially constant. Therefore, decoding symbols based on the centers of elements, rather than on the edges of the elements, provides a more robust and effective method of decoding symbols. Further details on identifying elements in the intermediate region of a profile may be found in the inventors above listed U.S. Patents and Applications.

The routine 100 can employ additional subroutines to further enhance locating and decoding profiles from color data collection symbols. For example, the routine 100 can employ an auto discrimination routine that attempts to locate various types of defined portions (e.g., finder patterns and start/stop codes) from the string of center distances to thereby determine from which symbology the symbol was generated. Additionally, the routine 100 can correct for any acceleration or optical distortions that occurred during the generation of the stored image. Autodiscrimination routines and acceleration and optical distortion correction routines are known in the art, and therefore need not be described herein. Furthermore, the routine 100 can employ any other subroutines or techniques described in the U.S. Patents and Applications noted above, such as methods of enhancing resolution of reflectance signals.

Printer and Data Structure For Color Symbols

Referring to FIG. 7, a printer 150 includes a print engine 152 that prints color machine-readable symbols, such as the symbol 53. The print engine 152 can be any known color print engine, such as thermographic, electrostatic, impact, ink jet, etc. A print driver or processor 154, coupled to the print engine 152, receives data to be printed, and converts the data to corresponding print driver instructions or signals based on the color symbology noted above. Methods of converting input data, such as ASCII data, into symbology fonts or codes is well know.

The printer 150 may include a memory 156 that stores a data structure for the color symbology, namely, data that represents every character or symbol in the color symbology. Such a data structure defines the size and color of each element of each symbol in the color symbology. Indeed, any processor-readable or computer-readable medium may store the data structure defining the color symbology, such as microcode stored in a semiconductor chip, on a computer-readable disk (e.g. optical or magnetic), or downloaded from a server and stored locally at a client. The printer includes the ability to produce at least three distinct colors, or only two distinct colors, where the third color is the result of no printing. The colors are chosen with knowledge of the scanning color and may be measured using the scanning color to ensure that the high, low and intermediate reflectance states result.

The invention is, at times, described above graphically for ease of presentation and understanding. Those skilled in the art will recognize that the reader 50 of the present invention preferably does not graphically analyze and decode a given profile, but instead analyzes the values of elements or signal portions in a profile. Additionally, the invention is described as employing three colors, but could include more than three colors. As used herein, the word "color" does not necessarily mean a pleasing tone to the eye, but any three tones, surface finishes or surface reliefs that produce three different optical or reflectance states, and corresponding peaks, valleys and intermediate portions in a profile. Thus, the three colors can have optical states not normally pleasing to the eye like black, white, and brown, or purple, tan and gray. The three colors can be one color in three different applications or applied by the printer 150 in three different ways, like solid color, half-tone color and no color.

Additionally, the three colors need not be printed at all, but instead be three different surface finishes on metal or other substrate, such as polished, dimpled and frosted finishes, or gloss, semi-gloss and matte finishes, or shiny, matte and dull finishes. Each of these differing finishes can produce the requisite three distinct optical states. Alternately, the these optical states may be relief formed in any permanent substrate to produce elements that are (i) flush with the surrounding surface, (ii) recessed by one increment, and (iii) recessed by two increments, to produce three differing optical states. Such relief formed symbols are decodable using the above method in combination with the inventor's teachings in U.S. Pat. No. 5,798,513, entitled "Method and Apparatus for Decoding Unresolved Profiles Produced From Relief Formed Symbols."

Figure 8:
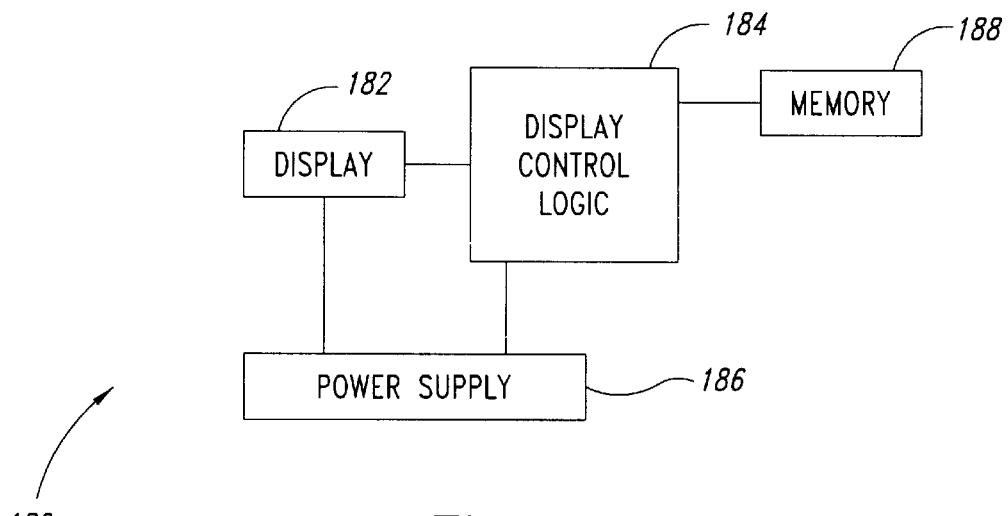
FIG. 8 is a block diagram of a display system for displaying color symbols under an aspect of the invention.

Furthermore, the three optical states may be produced by other processes such as with items like holograms and liquid crystal displays. Referring to FIG. 8, a display system 180 for displaying a three color symbol includes a display 182 such as a liquid crystal display (LCD), coupled to display control logic 184, and a power supply 186. The control logic 184 includes a memory 188 storing fonts for displaying color symbols. Additionally, the control logic 184 provides control and logic signals to the display 182 to display one or more of the symbols stored in the memory. The display 182 may be a color LCD, or may be monochrome to produce dark, light and intermediate color elements. Furthermore, the display 182 may instead be an LED device, field emission display or any other know display device. The power supply may be a battery, to thereby make the display system portable. Indeed, the display system may form part of a larger device, such as a printer or reader.

Accordingly, it can be appreciated by those skilled in the art that various equivalent modifications of the above-described embodiments may be made without departing from the spirit and scope of the invention. For example, while the invention has been described above with respect to a method performed by the processor 60, the routine 100 can be implemented using appropriate circuitry, such as minimum and maximum locating circuits, thresholding circuits, etc.

Although specific embodiments of, and examples for, the invention are described herein for illustrative purposes, various other equivalent modifications can be made. The teachings provided herein of the invention can be applied to other signal analysis systems, not necessarily the machine-readable profile analysis system described in detail above.

The various embodiments described above can be combined to provide further embodiments. All of the above U.S. patents and patent applications are incorporated by reference, as well as the inventor's U.S. patent application Nos. 09/419,534 and 09/420,610, entitled "Method and Apparatus for Reading Machine-Readable Symbols Including Color Symbol Elements" and "Method and Apparatus for Scanning Color Symbols," respectively, both filed on Oct. 18, 1999, and assigned to the assignee of this invention. Aspects of the invention can be modified, if necessary, to employ systems, circuits and concepts of the various patents and applications to provide yet further embodiments of the invention.

These and other changes can be made to the invention light of the above detailed description. In general, in the following claims, the terms used should not be construed to limit the invention to the specific embodiments disclosed in the specification and the claims, but should be construed to include any machine vision system, or signal processing system, that operates in accordance with the claims to provide processing of three state signals. Accordingly, the invention is not limited by the disclosure, but instead its scope is to be determined entirely by the following claims.

I claim:

1. A method of decoding a bar code symbol representing encoded information, the bar code symbol including a plurality of bars, the method comprising:

receiving light reflected from the bar code symbol and producing an output signal therefrom that represents the bars comprising the bar code symbol, wherein the output signal includes valleys and peaks, wherein a first set of bars have at least a first color that produce valleys in the output symbol, a second set of bars have at least a second color and produce peaks in the output signal, and a third set of bars have at least a third color;

identifying the first and second sets of bars of the first and second colors based on valleys and peaks in the output signal having low and high reflectance, all respectively;

identifying the third set of bars having the third color based on an intermediate reflectance in the output signal;

measuring distances between the valleys and peaks of the identified bars of the first and second colors;

determining at least one representative narrow width of the bars of the first, second or third color based on the identified bars of the first and second colors and the measured distances;

determining a size and location of the plurality of bars based on at least the representative narrow width, and the measured distances; and determining the information encoded as in the bar code symbol.

2. The method of claim 1 wherein the first, second and third colors correspond respectively to high, low and intermediate optical states, wherein measuring distances includes measuring center distances between the centers of the valleys and peaks of the identified bars of the first and second colors, wherein determining a size and location includes:
creating a matrix that identifies a width of the bars having the third color, the matrix being created based on center distances and the representative narrow width; and
determining the size and location of the bars having the third color by comparing the measured center distances to the matrix.

3. The method of claim 1 wherein determining the size and location includes creating a matrix that identifies the size or number of bars having the third color and filling in the matrix with a determined number of the representative narrow widths.

4. The method of claim 1 wherein the first and second colors are complementary with respect to a color wheel, and wherein the symbol is selected from an industry standard symbology.

5. The method of claim 1 wherein the symbol includes at least one bar of a third size, and wherein identifying first and second sets of bars includes defining a plurality of thresholds for the output signal.

6. The method of claim 1 wherein receiving light includes scanning the symbol with a laser beam, and wherein a color of the laser beam is matched to the first color.

7. A method of decoding a machine-readable symbol representing encoded information, the symbol including a plurality of relatively spaced two-dimensional geometric elements, the method comprising:

receiving data representing light reflected from the elements of the symbol, wherein some elements have at least first and second colors, and wherein other elements have at least a third color;

identifying the elements of first and second colors as high and low reflectance elements in the received data;

identifying the elements of the third color as intermediate reflectance elements in the received data;

determining distances between the elements of the first and second colors in the received data; and, determining the information encoded in the symbol based on the determined distances between the elements of the first and second colors in the received data.

8. The method of claim 7 wherein the first, second and third colors correspond respectively to high, low and intermediate optical states, wherein determining distances includes measuring center distances between the centers of valleys and peaks in the received data, and wherein determining the information encoded in the symbol includes:
   creating a matrix that identifies a number and size of the elements having the third color, the matrix being created based on center distances and a representative first size; and
   determining a number and location of the elements having the third color by comparing the measured center distances to the matrix.

9. The method of claim 7 wherein determining the information encoded in the symbol includes creating a matrix that identifies a number and size of elements having the third color and filling in the matrix.

10. The method of claim 7 wherein the first and second colors are complementary with respect to a color wheel, and wherein the symbol is selected from an industry standard symbology.

11. The method of claim 7 wherein the symbol includes elements of at least first, second and third sizes, and wherein identifying the elements of first and second colors includes defining a plurality of thresholds for the received data, and wherein portions of the received data extending beyond the plurality of thresholds correspond to elements of the first and third sizes.

12. The method of claim 7 wherein receiving data includes scanning the symbol with a laser beam, and wherein a color of the laser beam is matched to the first color.

13. The method of claim 7 wherein the first and second colors represent polished and matte surfaces, respectively.

14. The method of claim 7 wherein the first and second colors represent differing portions formed in a holographic substrate.

15. The method of claim 7 wherein the first and second colors are light and dark states in a liquid crystal display.

16. The method of claim 7 wherein the symbol is relief formed in a surface, and wherein the first and second colors are flush and recessed portions of the surface.

17. The method of claim 7 wherein the symbol includes elements of at least first, second and third sizes, and wherein identifying the elements of first and second colors includes measuring widths of peaks and valleys in the received data at two thresholds.

18. An apparatus for decoding a machine-readable symbol representing encoded information, the machine-readable symbol including a plurality of relatively spaced shapes, the apparatus comprising:
   a sensor that senses the machine-readable symbol and produces an output signal therefrom that represents shapes comprising the symbol, wherein some of the shapes have at least first and second colors, and other shapes have at least a third color;
   a receiving and processing circuit that receives the output signal and identifies shapes of the first and second colors in the output signal as identified peaks and valleys in the output signal and shapes of the third color as intermediate portions of the output signal, measures distances between the identified peaks and valleys, and produces a signal indicative of the information encoded in the machine-readable symbol based on the shapes of the first and second color and a number and size of shapes of the third color.

19. The apparatus of claim 18, further comprising a hand-held housing at least partially enclosing the sensor and the receiving and processing circuit, and a trigger switch coupled to the processor, wherein the receiving and processing circuit includes a receiver and a processor, wherein the receiver receives the output signal as an analog waveform and produces a digital output signal therefrom, wherein the processor receives the digital output signal from the receiver, and wherein the receiver and the processor are monolithically integrated.

20. The apparatus of claim 18 wherein the first, second and third colors correspond respectively to high, low and intermediate optical states, wherein the receiving and processing circuit measures center distances between centers of valleys and peaks in the output signal, determines a representative first size, creates a matrix that identifies a size and number of the shapes having the third color, the matrix being created based on center distances and the representative first size, and determines a size and location of the shapes having the third color by comparing the measured center distances to the matrix.

21. The apparatus of claim 18 wherein the receiving and processing circuit creates a matrix that identifies shapes having the third color and fills in the matrix based on a determined first size.

22. The apparatus of claim 18 wherein the first and second colors are complementary with respect to a color wheel, and wherein the symbol is selected from an industry standard symbology.

23. The apparatus of claim 18 wherein the symbol includes shapes of at least first, second and third sizes, and wherein the receiving and processing circuit defines a plurality of thresholds for the output signal, and identifies portions of the received data extending beyond the plurality of thresholds as corresponding to shapes of the first and third sizes.

24. The apparatus of claim 18, further comprising a laser scanner that produces a laser beam, wherein a color of the laser beam is matched to the first color.

25. The apparatus of claim 18, further comprising at least one filter having a color that is matched to the first color.

26. The apparatus of claim 18 wherein the first and second colors of the symbols represent matte and smooth surfaces, respectively.

27. A machine-readable symbology having machine-readable symbols representing information encoded under an industry symbology standard, wherein each symbol in the machine-readable symbology includes a plurality of relatively spaced two-dimensional geometric elements, wherein the elements have at least first and second sizes, wherein the elements of the second size have at least low and high optical states, wherein the elements of the first size have an intermediate optical state, and wherein the low, intermediate and high optical states are differing portions formed in a holographic substrate.

28. A machine-readable symbology having machine-readable symbols representing information encoded under an industry symbology standard, wherein each symbol in the machine-readable symbology includes a plurality of relatively spaced two-dimensional geometric elements, wherein the elements have at least first and second sizes, wherein the elements of the second size have at least low and high optical states, wherein the elements of the first size have an intermediate optical state, wherein the low and high optical states are respective first and second colors complementary with respect to a color wheel, and wherein each symbol in the symbology is selected from a single industry standard symbology with the second size greater than the first size.

29. A machine-readable symbology having machine-readable symbols representing information encoded under an industry symbology standard, wherein each symbol in the machine-readable symbology includes a plurality of relatively spaced two-dimensional geometric elements, wherein the elements have at least first and second sizes, wherein the elements of the second size have at least low and high optical states, wherein the elements of the first size have an intermediate optical state, wherein the elements have only first and second sizes, and wherein the second size is greater than the first size.

30. A machine-readable symbology having machine-readable symbols representing information encoded under an industry symbology standard, wherein each symbol in the machine-readable symbology includes a plurality of relatively spaced two-dimensional geometric elements, wherein the elements have at least first and second sizes, wherein the elements of the second size have at least low and high optical states, wherein the elements of the first size have an intermediate optical state, and wherein at least one of the optical states is a color red.

31. A machine-readable symbology having machine-readable symbols representing information encoded under an industry symbology standard, wherein each symbol in the machine-readable symbology includes a plurality of relatively spaced two-dimensional geometric elements, wherein the elements have at least first and second sizes, wherein the elements of the second size have at least low and high optical states, wherein the elements of the first size have an intermediate optical state, wherein the low and high optical states are respective first and second primary colors, and wherein the intermediate optical state is a color adjacent to the first and second primary colors.

32. A machine-readable symbology having machine-readable symbols representing information encoded under an industry symbology standard, wherein each symbol in the machine-readable symbology includes a plurality of relatively spaced two-dimensional geometric elements, wherein the elements have at least first and second sizes, wherein the elements of the second size have at least low and high optical states, wherein the elements of the first size have an intermediate optical state, and wherein the low and high optical states are matched and unmatched, respectively, with respect to a color of a light source for automatically reading the symbology.

33. A machine-readable symbology having machine-readable symbols representing information encoded under an industry symbology standard, wherein each symbol in the machine-readable symbology includes a plurality of relatively spaced two-dimensional geometric elements, wherein the elements have at least first and second sizes, wherein the elements of the second size have at least low and high optical states, wherein the elements of the first size have an intermediate optical state, wherein the low and high optical states are matte and smooth surfaces, respectively, and wherein the intermediate optical state is a semi-smooth surface having an optical state between the matte and smooth surfaces.

* * * * *